United States Patent
Thurfjell et al.

(10) Patent No.: US 10,340,991 B2
(45) Date of Patent: Jul. 2, 2019

(54) NETWORK NODE AND METHOD THEREIN FOR DETERMINING A PRECODER FOR TRANSMISSIONS IN A WIRELESS COMMUNICATIONS NETWORK

(71) Applicant: Telefonaktiebolaget LM Ericsson (publ), Stockholm (SE)

(72) Inventors: Magnus Thurfjell, Luleå (SE); Sara Sandberg, Luleå (SE); Fredrik Lindqvist, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 29 days.

(21) Appl. No.: 15/542,837

(22) PCT Filed: Feb. 5, 2015

(86) PCT No.: PCT/SE2015/050126
§ 371 (c)(1),
(2) Date: Jul. 11, 2017

(87) PCT Pub. No.: WO2016/126177
PCT Pub. Date: Aug. 11, 2016

(65) Prior Publication Data
US 2018/0331737 A1      Nov. 15, 2018

(51) Int. Cl.
*H04B 7/04* (2017.01)
*H04B 7/0456* (2017.01)
(Continued)

(52) U.S. Cl.
CPC ........... *H04B 7/0486* (2013.01); *H04B 7/024* (2013.01); *H04B 7/0417* (2013.01);
(Continued)

(58) Field of Classification Search
CPC ..... H04B 7/0486; H04B 7/063; H04B 7/0632
See application file for complete search history.

(56) References Cited

U.S. PATENT DOCUMENTS

| 2012/0087332 A1 | 4/2012 | Kim et al. |
| 2014/0064109 A1* | 3/2014 | Krishnamurthy .... H04J 11/0053 370/252 |
| 2015/0131751 A1* | 5/2015 | Bayesteh ............ H04B 7/0413 375/267 |

FOREIGN PATENT DOCUMENTS

EP    2369756 A2    9/2011

OTHER PUBLICATIONS

NEC Group, "R1-105412: Enhancing MU-MIMO CQI," 3rd Generation Partnership Project (3GPP), TSG-RAN WG1 Meeting #62bis, Oct. 11-15, 2010, 12 pages, Xian, China.
(Continued)

*Primary Examiner* — Jean B Corrielus
(74) *Attorney, Agent, or Firm* — Sage Patent Group (57) ABSTRACT

Embodiments herein relate to a method performed by a network node for determining a precoder for a transmission to a first wireless device in a wireless communications network. The network node obtains at least a Rank Indicator, RI, of the channel used for transmissions to the first wireless device. The network node also obtains information about a preferred interference subspace for the transmissions to the first wireless device from a second wireless device in the wireless communications network, wherein the second wireless device is interfered by the transmissions to the first wireless device. The network node determines the precoder for the transmission to the first wireless device based on the obtained information about a preferred interference subspace if the at least obtained RI of the channel fulfills a first threshold criterion. Embodiments of the network node are also described.

30 Claims, 3 Drawing Sheets

(51) Int. Cl.
   *H04B 7/024*    (2017.01)
   *H04B 7/0417*   (2017.01)
   *H04B 7/0452*   (2017.01)
   *H04B 7/06*     (2006.01)
   *H04L 25/00*    (2006.01)
(52) U.S. Cl.
   CPC ........... *H04B 7/0452* (2013.01); *H04B 7/063* (2013.01); *H04B 7/0632* (2013.01); *H04L 25/00* (2013.01)

(56) References Cited

OTHER PUBLICATIONS

International Search Report and Written Opinion for International Patent Application No. PCT/SE2015/050126, dated Dec. 9, 2015, 15 pages.

* cited by examiner

NETWORK NODE AND METHOD THEREIN FOR DETERMINING A PRECODER FOR TRANSMISSIONS IN A WIRELESS COMMUNICATIONS NETWORK

This application is a 35 U.S.C. § 371 national phase filing of International Application No. PCT/SE2015/050126, filed Feb. 5, 2015, the disclosure of which is incorporated herein by reference in its entirety.

TECHNICAL FIELD

Embodiments herein relate to determining precoders. In particular, embodiments herein relate to a network node in a wireless communications network and method therein for determining a precoder for a transmission to a first wireless device in a wireless communications network.

BACKGROUND

In a typical wireless, cellular or radio communications network, wireless devices, also known as mobile stations, terminals, and/or User Equipment, UEs, communicate via a Radio-Access Network, RAN, with one or more core networks. The RAN covers a geographical area which is divided into cells, with each cell being served by a base station, e.g. a radio base station, RBS, or network node, which in some networks may also be called, for example, a "NodeB", "eNodeB" or "eNB". A cell is a geographical area where radio coverage is provided by the radio base station at a base station site or an antenna site in case the antenna and the radio base station are not collocated. One radio base station may serve one or more cells.

A Universal Mobile Telecommunications System, UMTS, is a third generation mobile communication system, which evolved from the second generation, 2G, Global System for Mobile Communications, GSM. The UMTS terrestrial radio-access network, UTRAN, is essentially a RAN using wideband code-division multiple access, WCDMA, and/or High-Speed Packet Access, HSPA, to communicate with user equipment. In a forum known as the Third Generation Partnership Project, 3GPP, telecommunications suppliers propose and agree upon standards for third generation networks and UTRAN specifically, and investigate enhanced data rate and radio capacity. In some versions of the RAN, as e.g. in UMTS, several base stations may be connected, e.g., by landlines or microwave, to a controller node, such as a radio network controller, RNC, or a base station controller, BSC, which supervises and coordinates various activities of the plural base stations connected thereto. The RNCs are typically connected to one or more core networks.

Specifications for the Evolved Packet System, EPS, have been completed within the 3$^{rd}$ Generation Partnership Project, 3GPP, and this work continues in the coming 3GPP releases. The EPS comprises the Evolved Universal Terrestrial Radio-Access Network, E-UTRAN, also known as the Long-Term Evolution, LTE, radio access, and the Evolved Packet Core, EPC, also known as System Architecture Evolution, SAE, core network. E-UTRAN/LTE is a variant of a 3GPP radio-access technology wherein the radio base station nodes are directly connected to the EPC core network rather than to RNCs. In general, in E-UTRAN/LTE the functions of a RNC are distributed between the radio base station nodes, e.g. eNodeBs in LTE, and the core network. As such, the Radio-Access Network, RAN, of an EPS has an essentially flat architecture comprising radio base station nodes without reporting to RNCs.

Many modern wireless technologies use multiple antenna techniques for efficient transmission. There are several ways to utilize multiple antennas, such as, for example, transmit diversity, beam-forming and spatial multiplexing. However, multiple antennas may also be used for interference mitigation. In this case, when a network node determines the precoders to be used for transmissions to a wireless device, the decision may be based on different strategies. One example of a strategy may be to optimize the signal towards the served wireless device, and another example of a strategy may be to minimize the interference to other wireless devices. One way to reduce the interference for another wireless device is to align the interference with other interfering signals to that wireless device. This is because the several interfering signals may then be cancelled at the wireless device using, for example, an Interference Rejection Combining, IRC, receiver. However, to achieve a total or full interference alignment, coordinated precoder settings between multiple transmitting network nodes is required. This may, for example, be achieved through iterative precoder calculation methods or by connecting the network nodes into clusters.

The gain from using multiple antennas when transmitting from a network node depends on the scenario. For example, in a Line-of-Sight, LoS, situation, i.e. where there is nothing blocking the transmission path between the network node and the wireless device, the channel correlation is typically higher due to reduced angular spread and the channel quality is typically higher. In these conditions, the gain of using spatial multiplexing is often low, which means that beam-forming may preferably be used instead. Here, in a case where two transmitting antennas are used, an achievable gain by using beam-forming is about 3 dB. This means that the average loss by not implementing such a beam-forming precoder and instead using a randomly selected precoder in this case is never more than 3 dB. It should also be noted that the corresponding throughput gain from a 3 dB signal-to-interference-and-noise ratio, SINR, gain is further reduced as SINR levels increase. Practical limitations, such as, e.g. the use of the highest Modulation and Coding Scheme, MCS, further limits the gain achievable at higher channel quality levels.

If multiple antenna sets with orthogonal polarizations are used, the achievable beam-forming gain per polarization is still 3 dB. Furthermore, the inter-polarization coupling is not heavily dependent of the precoding. Therefore, the above reasoning around the effect of a randomly selected precoder may also be applied per polarization in an antenna configuration with more than one polarization.

SUMMARY

It is an object of embodiments herein to provide a way of determining a precoder for transmissions in a wireless communications network which increase the throughput.

According to a first aspect of embodiments herein, the object is achieved by a method performed by a network node for determining a precoder for a transmission to a first wireless device in a wireless communications network. The network node obtains at least a Rank Indicator, RI, of the channel used for transmissions to the first wireless device. Also, the network node obtains information about a preferred interference subspace from a second wireless device in the wireless communications network, wherein the second wireless device is interfered by the transmissions to the first wireless device. The network node further determines the precoder for the transmission to the first wireless device based on the obtained information about a preferred interference subspace if the obtained at least RI of the channel fulfills a first threshold criterion.

According to a second aspect of embodiments herein, the object is achieved by a network node in a wireless communications network for determining a precoder for a transmission to a first wireless device in a wireless communications network. The network node comprises a receiver configured to obtain at least a RI of the channel used for transmissions to the first wireless device, and obtain information about a preferred interference subspace from a second wireless device in the wireless communications network, wherein the second wireless device is interfered by the transmissions to the first wireless device. The network node also comprises a processor configured to determine the precoder for the transmission to the first wireless device based on the obtained information about a preferred interference subspace if the obtained at least RI of the channel fulfills a first threshold criterion.

According to a third aspect of embodiments herein, the object is achieved by a method performed by a second wireless device served by a second network node in a wireless communications network for enabling a first network node to determine a precoder for a transmission to a first wireless device in the wireless communications network. The second wireless device detects interference caused by transmissions from the first network node to the first wireless device. Then, the second wireless device determines a preferred interference subspace for the interference caused by the transmissions from the first network node to the first wireless device. The second wireless device also determines an estimated throughput gain that the second wireless device will experience in case the first network node determines a precoder for the transmissions from the first network node to the first wireless device based on the determined information about a preferred interference subspace. The second wireless device then transmits information indicating the determined preferred interference subspace and the estimated throughput gain to the first network node via the second network node if the determined estimated throughput gain is above a determined threshold.

According to a fourth aspect of embodiments herein, the object is achieved by a second wireless device served by a second network node in a wireless communications network for enabling a first network node to determine a precoder for a transmission to a first wireless device in the wireless communications network. The second wireless device comprises a receiver configured to detect interference caused by transmissions from the first network node to the first wireless device. The second wireless device also comprises a processor configured to determine a preferred interference subspace for the interference caused by the transmissions from the first network node to the first wireless device, and to determine an estimated throughput gain that the second wireless device will experience in case the first network node determines a precoder for the transmissions from the first network node to the first wireless device based on the determined information about a preferred interference subspace. The second wireless device further comprises a transmitter configured to transmit information indicating the determined preferred interference subspace and the estimated throughput gain to the first network node via the second network node if the estimated throughput gain is above a determined threshold.

According to a fifth aspect of embodiments herein, the object is achieved by a computer program, comprising instructions which, when executed on at least one processor, cause the at least one processor to carry out the method described above. According to a sixth aspect of embodiments herein, the object is achieved by a carrier containing the computer program described above, wherein the carrier is one of an electronic signal, optical signal, radio signal, or computer readable storage medium.

By obtaining information about the rank of the channel towards a first wireless device to which the network node is transmitting and obtaining information regarding a preferred interference subspace of a second wireless device being interfered by the transmissions to the first wireless device, the network node may correlate this information to determine a more optimal precoder for the transmissions towards the first wireless device which will increase the throughput in the wireless communications network.

For example, if the rank of the channel towards the first wireless device is low, then determining a non-optimal precoder in view of the first wireless device in the network node provides a limited throughput loss for the transmissions towards the first wireless device. Hence, in this case, the network node may instead determine a precoder for the transmissions based on the preferred interference subspace of the interfered second wireless device, thus reducing the interference towards the second wireless device. This may in turn lead to a higher throughput gain being achieved in the wireless communications network.

Hence, a way of determining a precoder for transmissions in a wireless communications network which increases the throughput is provided.

BRIEF DESCRIPTION OF THE DRAWINGS

Features and advantages of the embodiments will become readily apparent to those skilled in the art by the following detailed description of exemplary embodiments thereof with reference to the accompanying drawings, wherein.

DETAILED DESCRIPTION

The figures are schematic and simplified for clarity, and they merely show details which are essential to the understanding of the embodiments presented herein, while other details have been left out. Throughout, the same reference numerals are used for identical or corresponding parts or steps.

Figure 1:
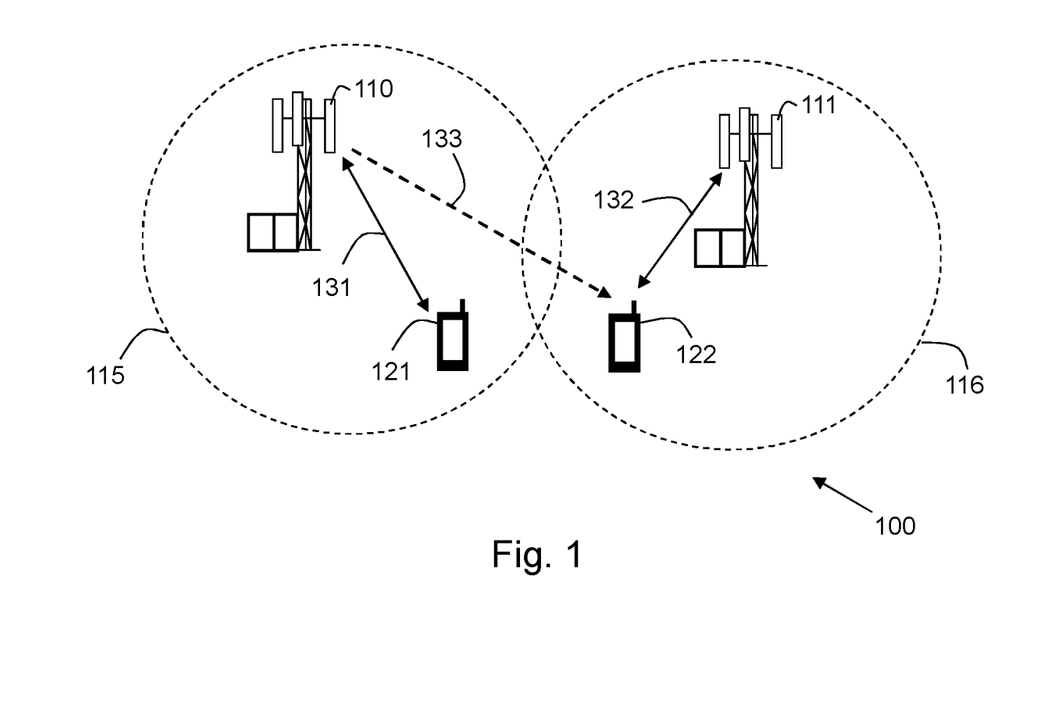
FIG. 1 is a schematic block diagram illustrating embodiments of a network node and a wireless device in a wireless communications network.

FIG. 1 shows an example of a wireless communications network 100 in which embodiments herein may be implemented. Although illustrated in FIG. 1 as an LTE network, the wireless communications network 100 may be any wireless or radio communication system, such as, LTE-Advanced, Wideband Code-Division Multiple Access (WCDMA), Global System for Mobile communications/Enhanced Data rate for GSM Evolution (GSM/EDGE), Worldwide Interoperability for Microwave Access (WiMax), Ultra Mobile Broadband (UMB) or GSM network, or other cellular network or system.

The wireless communications system 100 comprises a first and a second network node 110, 111. The first and the second network node 110, 111 may e.g. be an eNB, eNodeB, or a Home Node B, a Home eNode B, femto Base Station (BS), pico BS or any other network unit capable to serve a wireless device in the wireless communications system 100. The network nodes 110, 111 may also be e.g. a radio base station, a base station controller, a network controller, a relay node, a repeater, an access point, a radio-access point, a Remote Radio Unit (RRU) or a Remote Radio Head (RRH). Furthermore, the network nodes 110, 111 comprises multiple antennas for wireless radio communication with wireless devices located within their coverage range; that is, the network node 110, 111 may use one or more of its antennas to provide radio coverage within its corresponding cell 115, 116.

A first and a second wireless device 121, 122 are located within the cell 115, 116, respectively. The first wireless device 121 is configured to communicate within the wireless communications network 100 via the network node 110 over a channel of a radio link when present in the cell 115 served by the network node 110. The second wireless device 122 is configured to communicate within the wireless communications network 100 via the network node 111 over a channel of a radio link when present in the cell 116 served by the network node 111. The first and second wireless device 121, 122 may e.g. be any kind of wireless device such as a mobile phone, a cellular phone, a Personal Digital Assistant (PDA), a smart phone, a tablet, a sensor equipped with a wireless device, Laptop-Mounted Equipment (LME), Laptop-Embedded Equipment (LEE), Machine-Type-Communication (MTC) device, a wireless device with D2D capability, Customer-Premises Equipment (CPE), etc.

Furthermore, although embodiments below are described with reference to the scenario of FIG. 1, this scenario should not be construed as limiting to the embodiments herein, but merely as an example made for illustrative purposes.

As part of developing the embodiments herein, it has been noticed that in scenarios where the path loss between the first network node 110 and the first wireless device 121 in the cell 115 is low, there is also a high probability that both the SINR of transmissions 131 between the first network node 110 and the first wireless device 121 is high and that the rank of the channel used by transmissions 131 between the first network node 110 and the first wireless device 121 is low. In these types of scenarios, the gain or benefit of using beam-forming in order to improve the SINR of the channel between the first network node 110 and the first wireless device 121 are limited. Also, the benefits of using spatial multiplexing, such as, e.g. Single User Multiple-Input and Multiple-Output, SU-MIMO, transmit diversity, are also limited in these cases.

However, a second wireless device 122 in cell 116 which is being interfered by the transmissions 131 between the first network node 110 and the first wireless device 121, as indicated in FIG. 1 by the dashed arrow, may be experiencing poor transmission conditions in the cell 116 from the second network node 111. In this case, the interfering channel between the first network node 110 and the second wireless device 122 is likely to have a higher channel rank than the channel between the first network node 110 and the first wireless device 121, which is beneficial for reducing interference using e.g. Interference Alignment, IA, techniques.

Hence, for these types of scenarios, it may thus be more advantageous in terms of the capacity of the wireless communications network 100 to focus on mitigating the interference caused by the transmissions 131 between the first network node 110 and the first wireless device 121 rather than trying to improve the SINR for the transmissions 131 between the first network node 110 and the first wireless device 121.

In accordance with the embodiments described herein, this is addressed by providing a low-complexity mechanism to switch between two different ways of determining a precoder for a transmission between the first network node 110 and the first wireless device 121 that is based on the channel correlation properties, e.g. RI and CQI in a wireless communications network based on LTE. In particular, the channel correlation properties are used to decide if the precoder should be determined such that the SINR to the first wireless device 121 is to be maximized or determined such that the interference to the second wireless device 122 is to be reduced. This may be performed by relying on preferred interference subspaces that are communicated from the interfered wireless devices, such as, the second wireless device 122.

Figure 2:
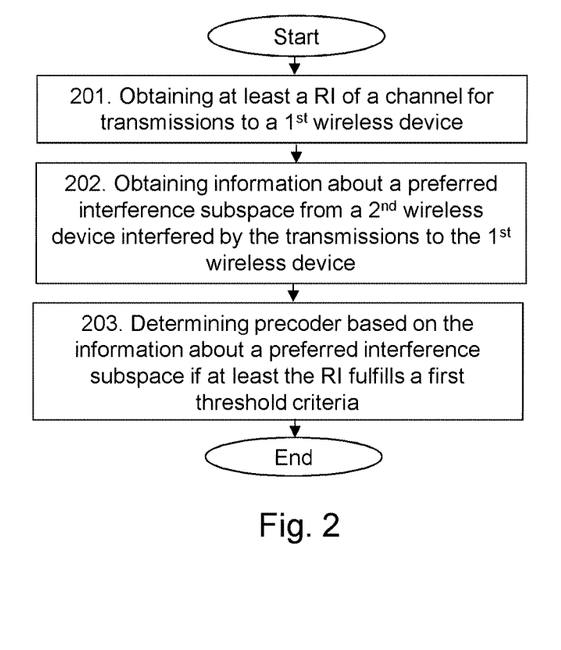
FIG. 2 is a flowchart depicting embodiments of a method in a network node.

Example of embodiments of a method performed by a network node 110 for determining a precoder for a transmission 131 to a first wireless device 121 in a wireless communications network 100, will now be described with reference to the flowchart depicted in FIG. 2. FIG. 2 illustrates an example of actions or operations which may be taken by the network node 110. The method may comprise the following actions.

Action 201

The network node 110 obtains at least a Rank Indicator, RI, of the channel used for transmissions to the first wireless device 121. In some embodiments, the network node 110 may receive the RI of the channel used for transmissions to the first wireless device 121 from the first wireless device 121. Here, the RI may be received as part of the channel-status reports, such as, e.g. Channel Status Information reports, CSI reports, in LTE, transmitted by the first wireless device 121 to the network node 110. Alternatively, in some embodiments, the network node 110 may measure on transmissions received from the first wireless device 121 and then determine the RI based on the transmission measurements.

The RI provides information about the channel rank, or expressed differently, the number of transmission layers or streams that should, preferably, be used for downlink transmission to the first wireless device 121. In other words, the RI may be said to be indicative of the number of transmission layers preferably used for the transmissions 131 to the first wireless device 121.

In some embodiments, the network node may also obtain a Channel Quality Indicator, CQI, of the channel used for transmissions to the first wireless device 121. Similarly as for the RI, the network node 110 may receive the CQI of the channel used for transmissions to the first wireless device 121 from the first wireless device 121. The CQI may, here, also be received as part of the channel-status reports, e.g. CSI reports in LTE, transmitted by the first wireless device 121 to the network node 110. Alternatively, in some embodiments, the network node 110 may measure on transmissions received from the first wireless device 121 and then determine the CQI based on the transmission measurements.

The CQI provides information on a recommended modulation scheme and coding rate that should, preferably, be used for downlink transmission to the first wireless device 121. The CQI indicates one modulation-scheme/coding-rate combination in a table that consists of a set of pre-defined modulation-scheme/coding-rate combinations. The recommended modulation scheme and coding rate, i.e. CQI, will depend on the received signal-to-interference-plus-noise-ratio, SINR. Thus, in other words, the CQI may be said to be indicative of a SINR of the channel used for transmissions to the first wireless device 121. The CQI may be measured by the first wireless device 121 and reported to the network node 110 in the CSI reports, or measured by the network node 110 on transmissions from the first wireless device 121.

Action 202

The network node 110 further obtains information about a preferred interference subspace from a second wireless device 122 in the wireless communications network 100, wherein the second wireless device 122 is interfered by the transmissions to the first wireless device 121. This advantageously allows the network node 110 to both be informed about the second wireless device 122 in the wireless communications network 100 that is being interfered by the transmission to the first wireless device 121, and about how the second wireless devices 122 would prefer the transmission to the first wireless device 121 to be performed by the network node 110 in order to provide a more suitable interference towards the second wireless devices 122.

For example, the second wireless device 122 may send a report that comprise the information necessary for the network node 110 in cell 115 to determine the precoder or precoder settings for the transmission to the first wireless device 121 so as to fulfil the reported preferred interference subspace requirement of the second wireless device 122. The information on the preferred subspace of the second wireless device 122 may be expressed either as information on the preferred subspace as seen from the second wireless device 122 or as information on the preferred subspace transformed into an equivalent subspace as seen from the network node 110 in cell 115. This may be performed by the second wireless device 122 based on the channel information measured by the second wireless device 122. In some embodiments, the second wireless device 122 may determine the preferred interference subspace by determining, or calculating, a Precoding Matrix Indicator, PMI, with which the second wireless device 122 wants the interference from the network node 110 to be transmitted. The PMI may here indicate a pre-coding matrix from a known codebook. Alternatively, the second wireless device 122 may specify the preferred interference subspace as a complex vector normal to its preferred interference subspace as seen from the second wireless device 122.

In case the information on the preferred subspace of the second wireless device 122 is expressed as information on the preferred subspace as seen from the second wireless device 122, the network node 110 may combine this information with information about the interference channel in order to be able to determine a suitable precoder or precoder setting for the transmission to the first wireless device 121.

In other words, the obtained information about a preferred interference subspace may, in some embodiments, comprise an indication of a subspace preferred by the second wireless device 122 for interference 133 caused by the transmissions to the first wireless device 121. Optionally, the indication may, for example, comprise a Precoding Matrix Indicator, PMI, indicating a pre-coding matrix in a codebook.

In some embodiments, the network node 110 may also receive an estimated throughput gain that the second wireless device 122 will experience in case the network node 110 determines the precoder based on the obtained information about a preferred interference subspace. For example, in case the preferred interference subspace is specified as a complex vector normal to the preferred interference subspace as seen from the second wireless device 122, then the estimated throughput gain may correspond to the absolute value of a communicated complex vector normal vector.

It should also be noted that the second wireless device 122 may transmit information about a preferred interference subspace when the second wireless device 122 detects an interference caused by transmissions by the first network node 110 to the first wireless device 121 or when the second wireless device 122 determines that an estimated throughput gain above a determined threshold may be achieved if the network node 110 where to use the information about a preferred interference subspace in the second wireless device 122 for transmissions to the first wireless device 121. The latter is described in the following with reference to FIG. 3.

Action 203

If at least the obtained RI of the channel fulfills a first threshold criterion, the network node 110 determines the precoder for the transmission 131 to the first wireless device 121 based on the obtained information about a preferred interference subspace. In other words, the network node 110 determines the precoder for the transmission 131 to the first wireless device 121 based on the obtained information about a preferred interference subspace when or in response to the at least obtained RI of the channel fulfilling a first threshold criterion. However, it should also be noted that this does not exclude that there may be further conditions or criterions in the network node 110 that also may be need to be fulfilled.

Advantageously, this provides a low-complexity solution for determining when to switch from selecting precoders in order to increase the throughput for the transmissions between the first network node 110 and the first wireless device 121. This means switching from selecting the precoder suggested by the first wireless device 121 in a CSI report or precoder settings determined by the network node 110 based on measurements of transmissions from the first wireless device 121, to selecting the precoder based on the obtained information about a preferred interference subspace reported by the second wireless device 122, i.e. selecting precoders in order to reduce the impact of the interference caused by the transmissions between the first network node 110 and the first wireless device 121 to other wireless devices, such as, the second wireless device 122.

In some embodiments, the first threshold criterion may be considered fulfilled if the RI is equal to or below the number of polarizations available for the transmissions 131 to the first wireless device 121. This means that if the RI of the channel towards the first wireless device 121 is low, i.e. equal to or below the number of polarizations, the network node 110 may determine a precoder based on the obtained information about a preferred interference subspace reported by the second wireless device 122, i.e. a precoder that will reduce the impact of the interference caused by the transmission to the first wireless device 121 for the second wireless device 122. Otherwise, if the RI of the channel towards the first wireless device 121 is high, i.e. above the number of polarizations, the network node 110 may determine a precoder based on the recommendations of the first wireless device 121 in a CSI report or precoder settings determined by the network node 110 based on measurements of transmissions from the first wireless device 121, i.e. a precoder that will improve the throughput of the transmission to the first wireless device 121, such as, e.g. improve the SINR via beam-forming.

In other words, the network node 110 may, upon receiving the report from the second wireless device 122, first check the obtained RI of the channel used for transmissions to the first wireless device 121. In case the obtained RI indicates a rank that is higher than the number of polarizations, the network node 110 may ignore the report from the second wireless device 122 and determine the precoder based on the recommendations of the first wireless device 121 in a CSI report or precoder settings determined by the network node 110 based on measurements of transmissions from the first wireless device 121. In case the obtained RI indicates a rank that is equal to or lower than the number of polarizations, the network node 110 may determine the precoder according to the preferred interference subspace information provided in the report by the second wireless device 122. This may comprise continuously updating the precoder such that the precoder follows changes in the channel between the network node 110 and the interfered second wireless device 122, thus performing the transmission to the first wireless device 121 such that the interference will occur in the preferred interference subspace. Here, it should be noted that the network node 110 may when determining the precoder not move the interference from the transmission perfectly in place within the preferred interference subspace. However, this is not crucial as long as the sum of all interferer's components in the normal direction of the preferred interference subspace is reduced, preferably as much as possible. This means, for example, that any precoder that gives a smaller component in the normal direction than the precoder suggested in the CSI report from the first wireless device 121, or a precoder according to precoder settings determined by the network node 110 based on measurements of transmissions from the first wireless device 121, will yield reduced interference towards the second wireless device 122.

Furthermore, it should also be noted that the network node 110 may also take into account how transmitting the interference in the preferred interference subspace will interfere with several different wireless devices, not only the second wireless device 122.

In some embodiments, the preferred interference subspace may be reported in terms of a PMI. In this case, if the rank of the channel towards the first wireless device 121 is equal to or lower than the number of polarizations, the network node 110 may continuously update the precoder according to the reported PMI from the interfered second wireless device 122.

In some embodiments, in case of also obtaining the CQI in Action 201, network node 110 may also determine the precoder based on the obtained information about a preferred interference subspace if the obtained CQI of the channel fulfills a second threshold criterion. This is advantageous since in case the obtained RI is low and the obtained CQI is high, the throughput loss for the transmission 131 will be small in case of selecting another precoder than the precoder recommended by the first wireless device 121 in the CSI report or a precoder according to precoder settings determined by the network node 110.

In some embodiments, the second threshold criterion may be considered fulfilled if the CQI is equal to or above a determined threshold value. For example, if the rank of the channel towards the first wireless device 121 is equal to or lower than the number of polarizations and the obtained CQI is equal to or above a determined threshold, the first network node 110 may determine the precoder based on the obtained information about a preferred interference subspace reported by the second wireless device 122, i.e. a precoder that will reduce the impact of the interference caused by the transmission 131 to the first wireless device 121 for the second wireless device 122. Otherwise, if the rank of the channel towards the first wireless device 121 is equal to or lower than the number of polarizations and the obtained CQI is below a determined threshold, the first network node 110 may determine the precoder based on the recommendations of the first wireless device 121 in a CSI report or precoder settings determined by the network node 110 based on measurements of transmissions from the first wireless device 121.

In some embodiments, in case of also receiving the estimated throughput gain in Action 202, the network node 110 may also determine an estimated throughput loss that the first wireless device 121 will experience for the transmission 131 in case the network node 110 determines the precoder based on the obtained information about a preferred interference subspace. Then, the network node 110 may, if the determined estimated throughput loss is below the received estimated throughput gain in Action 202, determine the precoder based on the obtained information about a preferred interference subspace. This is advantageous since it enables the network node 110 to determine which precoder selection strategy is most advantageous, i.e. which precoding strategy improves the throughput the most in the wireless communications network 100. This means that the network node 110 may, by considering the determined estimated throughput loss and the received estimated throughput gain, determine that there is an advantage or gain by ignoring the recommendations of the first wireless device 121 in a CSI report, or precoder settings determined by the network node 110 based on measurements of transmissions from the first wireless device 121, and instead determine a precoder based on the obtained information about a preferred interference subspace reported by the second wireless device 122; for example, ignoring the recommended PMI in the CSI report from the first wireless device 121, or a PMI determined by the network node 110 based on measurements on transmissions from the first wireless device 121, and instead determining a precoder that aligns the interference with the received preferred interference subspace from the second wireless device 122.

According to a more detailed example, the network node 110 may, upon receiving the report from the second wireless device 122, first check the obtained RI of the channel used for transmissions to the first wireless device 121. In case the obtained RI indicates a rank that is higher than the number of polarizations, the network node 110 may ignore the report from the second wireless device 122, i.e. determine a precoder based on recommendations of the first wireless device 121 in a CSI report, or precoder settings determined by the network node 110 based on measurements of transmissions from the first wireless device 121. However, in case the obtained RI indicates a rank that is equal to or lower than the number of polarizations, the network node 110 may estimate the throughput loss that will be achieved for the transmission 131 to the first wireless device 121 by not determining the precoder based on the recommendations of the first wireless device 121 in a CSI report, or precoder settings determined by the network node 110 based on measurements of transmissions from the first wireless device 121. The throughput loss may, for example, be estimated from an obtained CQI, where the obtained CQI may be mapped to a certain SINR value. As previously described herein, the average SINR loss is limited to 3 dB for beam-forming using two antennas.

Then, if the determined estimated throughput loss is lower than the received estimated throughput gain from the second wireless device 122, the network node 110 may determine a precoder based on the obtained information about a preferred interference subspace reported by the second wireless device 122. However, if the determined estimated throughput loss is higher than the received estimated throughput gain from the second wireless device 122, the network node 110 may determine a precoder based on recommendations of the first wireless device 121 in a CSI report, or precoder settings determined by the network node 110 based on measurements of transmissions from the first wireless device 121.

Figure 3:
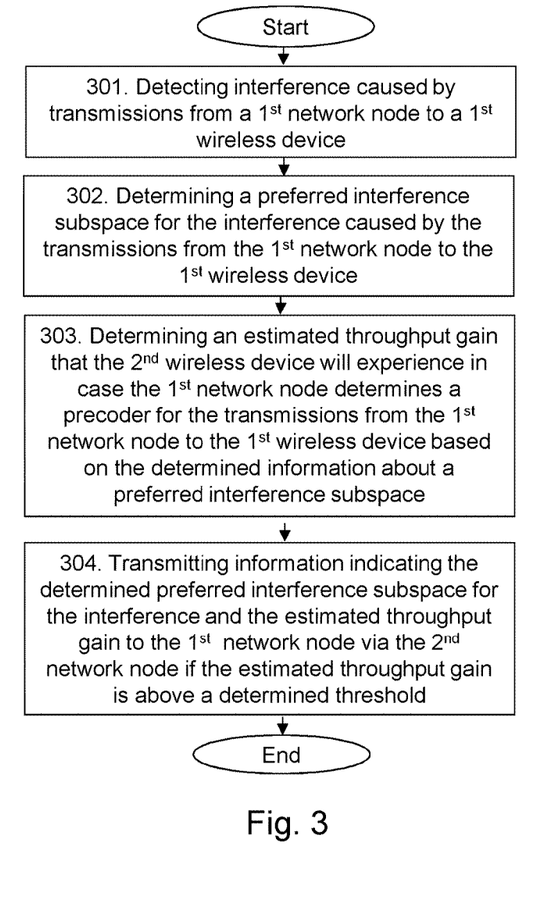
FIG. 3 is a flowchart depicting embodiments of a method in a wireless device.

Example of embodiments of a method performed by a second wireless device 122 served by a second network node 111 in a wireless communications network 100 for enabling a first network node 110 to determine a precoder for a transmission to a first wireless device 121 in the wireless communications network 100, will now be described with reference to the flowchart depicted in FIG. 3. FIG. 3 illustrates an example of actions or operations which may be taken by the second wireless device 122. The method may comprise the following actions.

Action 301

The second wireless device 122 detects interference caused by transmissions from the first network node 110 to the first wireless device 121. This means that the second wireless device 122 in cell 116 may detect the interference 133 from the transmissions 131 to the first wireless device 121 in cell 115. The second wireless device 122 may also measure the interference channel towards the network node 110 in cell 115.

Action 302

The second wireless device 122 also determines a preferred interference subspace for the interference caused by the transmissions from the first network node 110 to the first wireless device 121. This means that the second wireless device 122 may determine, or calculate, a subspace in which the second wireless device 122 would prefer the interference 133 to occur. It should be noted that the preferred interference subspace may also depend on the interference detected by the second wireless device 122 from other wireless devices (not shown) in the wireless communications network 100, as well as, its signal from the second network node 111.

The information on the preferred subspace of the second wireless device 122 may be expressed either as information on the preferred subspace as seen from the second wireless device 122, or as information on the preferred subspace transformed into an equivalent subspace as seen from the network node 110 in cell 115. This may be performed by the second wireless device 122 based on the channel information measured by the second wireless device 122. In some embodiments, the second wireless device 122 may determine the preferred interference subspace by determining, or calculating, a Precoding Matrix Indicator, PMI, with which the second wireless device 122 wants the interference from the network node 110 to be transmitted. Alternatively, the second wireless device 122 may specify the preferred interference subspace as a complex vector normal to its preferred interference subspace as seen from the second wireless device 122.

Action 303

The second wireless device 122 also determines an estimated throughput gain that the second wireless device 122 will experience in case the first network node 110 determines a precoder for the transmissions from the first network node 110 to the first wireless device 121 based on the determined information about a preferred interference subspace. This means that the second wireless device 122 also may determine an estimate of the resulting throughput gain in case the interference where to be transmitted in the preferred subspace of the second wireless device 122. In case the preferred interference subspace is specified as a complex vector normal to the preferred interference subspace as seen from the second wireless device 122, the estimated throughput gain may correspond to the absolute value of a communicated complex vector normal vector.

Action 304

If the determined estimated throughput gain determined in Action 303 is above a determined threshold, the second wireless device 122 transmits information indicating the determined preferred interference subspace and the estimated throughput gain to the first network node 110 via the second network node 111. This means that the second wireless device 122 may send a report to the network node 110 in cell 115 indicating the preferred interference subspace and the determined estimated throughput gain.

In some embodiments, the report may be transmitted by the second wireless device 122 if the determined estimated throughput gain is equal to or above a determined threshold level. This is because, in case determined estimated throughput gain is below a determined threshold level, the possible throughput gain from determining a precoder in the network node 110 based on the preferred interference subspace of the second wireless device 122 is small or insignificant. Hence, this may reduce the amount of unnecessary signalling in the wireless communication network 100.

Figure 4:
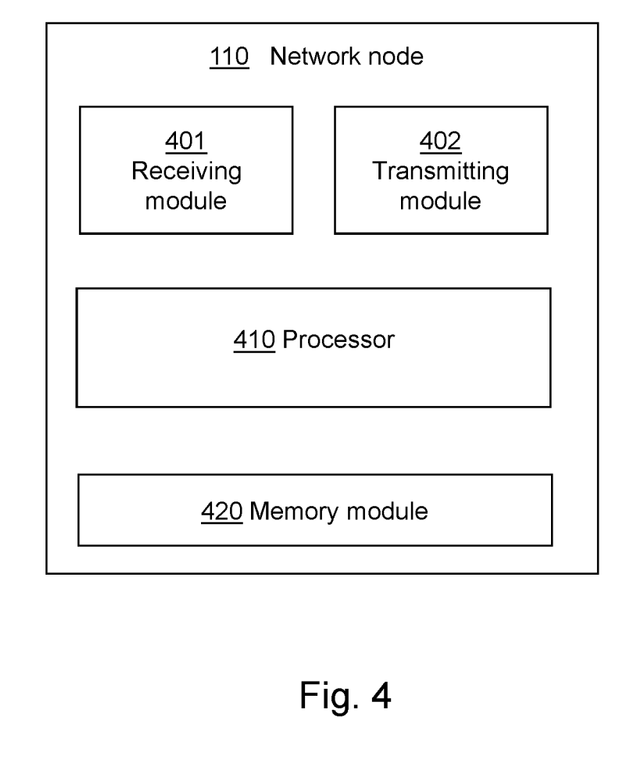
FIG. 4 is a schematic block diagram depicting embodiments of a network node.

To perform the method actions for determining a precoder for a transmission 131 to a first wireless device 121 in a wireless communications network 100, the network node 110 may comprise the following arrangement depicted in FIG. 4.

FIG. 4 shows a schematic block diagram of embodiments of the network node 110. In some embodiments, the network node 110 may comprise a receiving module 401, a transmitting module 402, and a processor 410. The receiving module 401 may also be referred to as a receiver or receiving unit, while the transmitting module 402 may also be referred to as transmitter or transmitting unit. The processor 410 may also be referred to as processing module, processing unit or processing circuitry, and may control the receiving module 401 and the transmitting module 402. Optionally, the processor 410 may be said to comprise one or more of the receiving module 401 and the transmitting module 402, and/or perform the function thereof as described below.

The receiver 401 is configured to obtain at least a Rank Indicator, RI, of the channel used for transmissions to the first wireless device 121. In some embodiments, the receiver 401 may also be configured to obtain a Channel Quality Indicator, CQI, of the channel used for transmissions to the first wireless device 121. The RI is indicative of the number of transmission layers, or data streams, preferably used for the transmissions 131 to the first wireless device 121, while the CQI is indicative of a signal quality of the channel, such as, e.g. a signal-to-interference-plus-noise-ratio, SINR, used for transmissions to the first wireless device 121. In some embodiments, the receiver 401 may be configured to receive the RI and/or CQI of the channel used for transmissions to the first wireless device 121 from the first wireless device 121.

The receiver 401 is also configured to obtain information about a preferred interference subspace from a second wireless device 122 in the wireless communications network 100, wherein the second wireless device 122 is interfered by the transmissions to the first wireless device 121. In some embodiments, the receiver 401 is further configured to receive the information about a preferred interference subspace from a network node 111 serving the second wireless device 122 in the wireless communications network 100.

The processor 410 is configured to determine the precoder for the transmission 131 to the first wireless device 121 based on the obtained information about a preferred interference subspace if the at least obtained RI of the channel fulfills a first threshold criterion. In some embodiments, the first threshold criterion is fulfilled if the RI is equal to or below the number of polarizations available for the transmissions 131 to the first wireless device 121. In some embodiments, the obtained information about a preferred interference subspace may comprise an indication of a subspace preferred by the second wireless device 122 for interference 133 caused by the transmissions to the first wireless device 121. Here, the indication may comprise, for example, a Precoding Matrix Indicator, PMI, indicating a pre-coding matrix in a codebook.

When the receiver 401 is further configured to obtain a CQI, the processor 410 may further be configured to determine the precoder based on the obtained information about a preferred interference subspace if the obtained CQI of the channel fulfills a second threshold criterion. In some embodiments, the second threshold criterion is fulfilled if the CQI is equal to or above a determined threshold value.

In some embodiments, the receiver 401 may further be configured to receive an estimated throughput gain that the second wireless device 122 will experience in case the network node 110 determines the precoder based on the obtained information about a preferred interference subspace. In this case, the processor 410 may be further configured to determine an estimated throughput loss that the first wireless device 121 will experience for the transmission 131 in case the network node 110 determines the precoder based on the obtained information about a preferred interference subspace, and to determine the precoder based on the obtained information about a preferred interference subspace if the determined estimated throughput loss is below the received estimated throughput gain.

In some embodiments, the processor 410 is further configured to measure transmissions received from the first wireless device 121, and to determine the RI and/or CQI based on the transmission measurements.

The embodiments for determining a precoder for a transmission 131 to a first wireless device 121 in a wireless communications network 100 may be implemented through one or more processors, such as, e.g. the processor 410 in the network node 110 depicted in FIG. 4, together with computer program code for performing the functions and actions of the embodiments herein. The program code mentioned above may also be provided as a computer program product, for instance in the form of a data carrier carrying computer program code or code means for performing the embodiments herein when being loaded into the processor 410 in the network node 110. The computer program code may e.g. be provided as pure program code in the network node 110 or on a server and downloaded to the network node 110. The carrier may be one of an electronic signal, optical signal, radio signal, or computer-readable storage medium, such as, e.g. electronic memories like a RAM, a ROM, a Flash memory, a magnetic tape, a CD-ROM, a DVD, a Blueray disc, etc.

The network node 110 may further comprise a memory 420, which may be referred to or comprise one or more memory modules or units. The memory 420 may be arranged to be used to store executable instructions and data to perform the methods described herein when being executed in or by the processor 410 of the network node 110. Those skilled in the art will also appreciate that the processor 410 and the memory 420 described above may refer to a combination of analog and digital circuits, and/or one or more processors configured with software and/or firmware, e.g. stored in the memory 420, that when executed by the one or more processors, such as, the processor 410, cause the one or more processors to perform the method as described above. The processor 410 and the memory 420 may also be referred to as processing means. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

From the above it may be seen that some embodiments may comprise a computer program product, comprising instructions which, when executed on at least one processor, e.g. the processor 410, cause the at least one processor to carry out the method for determining a precoder for a transmission 131 to a first wireless device 121 in a wireless communications network 100. Also, some embodiments may further comprise a carrier containing said computer program product, wherein the carrier is one of an electronic signal, optical signal, radio signal, or computer-readable storage medium.

Figure 5:
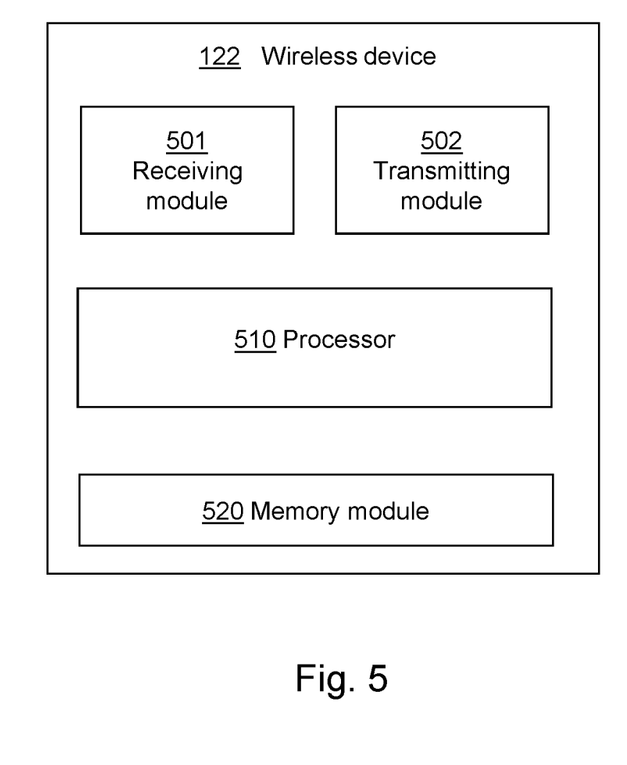
FIG. 5 is a schematic block diagram depicting embodiments of a wireless device.

To perform the method actions for enabling a first network node 110 to determine a precoder for a transmission to a first wireless device 121 in the wireless communications network 100, the second wireless device 122 may comprise the following arrangement depicted in FIG. 5.

FIG. 5 shows a schematic block diagram of embodiments of the second wireless device 122. In some embodiments, the second wireless device 122 may comprise a receiving module 501, a transmitting module 502, and a processor 510. The receiving module 501 may also be referred to as a receiver or receiving unit, while the transmitting module 502 may also be referred to as transmitter or transmitting unit. The processor 510 may also be referred to as processing module, processing unit or processing circuitry, and may control the receiving module 501 and the transmitting module 502. Optionally, the processor 510 may be said to comprise one or more of the receiving module 501 and the transmitting module 502, and/or perform the function thereof as described below.

The receiver 501 is configured to detect interference caused by transmissions from the first network node 110 to the first wireless device 121. The processor 510 is configured to determine a preferred interference subspace for the interference caused by the transmissions from the first network node 110 to the first wireless device 121. It should be noted that the preferred interference subspace may also depend on the interference detected by the receiver 501 from other wireless devices (not shown) in the wireless communications network 100, as well as, its signal from the second network node 111. The processor 510 is also configured to determine an estimated throughput gain that the second wireless device 122 will experience in case the first network node 110 determines a precoder for the transmissions from the first network node 110 to the first wireless device 121 based on the determined information about a preferred interference subspace. The transmitter 502 is configured to transmit information indicating the determined preferred interference subspace and the estimated throughput gain to the first network node 110 via the second network node 111 if the estimated throughput gain is above a determined threshold.

The embodiments for enabling a first network node 110 to determine a precoder for a transmission to a first wireless device 121 in the wireless communications network 100 may be implemented through one or more processors, such as, e.g. the processor 510 in the second wireless device 122 as depicted in FIG. 5, together with computer program code for performing the functions and actions of the embodiments herein. The program code mentioned above may also be provided as a computer program product, for instance in the form of a data carrier carrying computer program code or code means for performing the embodiments herein when being loaded into the processor 510 in the second wireless device 122. The computer program code may e.g. be provided as pure program code the second wireless device 122 or on a server and downloaded to the second wireless device 122. The carrier may be one of an electronic signal, optical signal, radio signal, or computer-readable storage medium, such as, e.g. electronic memories like a RAM, a ROM, a Flash memory, a magnetic tape, a CD-ROM, a DVD, a Blueray disc, etc.

The second wireless device 122 may further comprise a memory 520, which may be referred to or comprise one or more memory modules or units. The memory 520 may be arranged to be used to store executable instructions and data to perform the methods described herein when being executed in or by the processor 510 of the second wireless device 122. Those skilled in the art will also appreciate that the processor 510 and the memory 520 described above may refer to a combination of analog and digital circuits, and/or one or more processors configured with software and/or firmware, e.g. stored in the memory 520, that when executed by the one or more processors, such as, the processor 510, cause the one or more processors to perform the method as described above. The processor 510 and the memory 520 may also be referred to as processing means. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

From the above it may be seen that some embodiments may comprise a computer program product, comprising instructions which, when executed on at least one processor, e.g. the processor 510, cause the at least one processor to carry out the method for determining a precoder for a transmission to a first wireless device 121 in a wireless communications network 100. Also, some embodiments may further comprise a carrier containing said computer program product, wherein the carrier is one of an electronic signal, optical signal, radio signal, or computer-readable storage medium.

The terminology used in the detailed description of the particular embodiments illustrated in the accompanying drawings is not intended to be limiting of the described network node 110, second wireless device 122 and methods therein which instead should be construed in view of the enclosed claims.

As used herein, the term "and/or" comprises any and all combinations of one or more of the associated listed items.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

As used herein, the singular forms "a", "an" and "the" are intended to comprise also the plural forms as well, unless expressly stated otherwise. It will be further understood that the terms "includes," "comprises," "including" and/or "comprising," when used in this specification, specify the presence of stated features, actions, integers, steps, operations, elements, and/or components, but do not preclude the presence or addition of one or more other features, actions, integers, steps, operations, elements, components, and/or groups thereof.

Unless otherwise defined, all terms comprising technical and scientific terms used herein have the same meaning as commonly understood by one of ordinary skill in the art to which the described embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein are not limited to the above described preferred embodiments. Various alternatives, modifications and equivalents may be used. Therefore, the above embodiments should not be construed as limiting.

The invention claimed is:

1. A method performed by a network node for determining a precoder for transmissions to a first wireless device in a wireless communications network, the method comprising:
    obtaining at least a Rank Indicator, RI, of a channel used for the transmissions to the first wireless device;
    obtaining information about a preferred interference subspace from a second wireless device in the wireless communications network,
        wherein the second wireless device is interfered by the transmissions to the first wireless device; and
    determining the precoder for the transmissions to the first wireless device based on the obtained information about the preferred interference subspace if the at least obtained RI of the channel fulfills a first threshold criterion.

2. The method according to claim 1, wherein the RI is indicative of a number of transmission layers preferably used for the transmissions to the first wireless device.

3. The method according to claim 1, wherein the first threshold criterion is fulfilled if the RI is equal to or below a number of polarizations available for the transmissions to the first wireless device.

4. The method according to claim 1, further comprising obtaining a Channel Quality Indicator, CQI, of the channel used for the transmissions to the first wireless device, and determining the precoder for the transmissions to the first wireless device based on the obtained information about the preferred interference subspace if the obtained CQI of the channel fulfills a second threshold criterion.

5. The method according to claim 4, wherein the CQI is indicative of a signal-to-interference-plus-noise-ratio, SINR, of the channel to be used for the transmissions to the first wireless device.

6. The method according to claim 4, wherein the second threshold criterion is fulfilled if the CQI is equal to or above a determined threshold value.

7. The method according to claim 1, further comprising receiving an estimated throughput gain that the second wireless device experiences in case the network node determines the precoder based on the obtained information about the preferred interference subspace.

8. The method according to claim 7, further comprising determining an estimated throughput loss that the first wireless device experiences for the transmissions in case the network node determines the precoder based on the obtained information about the preferred interference subspace, and determining the precoder based on the obtained information about the preferred interference subspace if the determined estimated throughput loss is below the received estimated throughput gain.

9. The method according to claim 1, wherein the obtained information about the preferred interference subspace comprises an indication of a subspace preferred by the second wireless device for interference caused by the transmissions to the first wireless device.

10. The method according to claim 9, wherein the indication comprises a Precoding Matrix Indicator, PMI, indicating a pre-coding matrix in a codebook.

11. The method according to claim 1, further comprising measuring a first transmissions received from the first wireless device, and determining the RI and/or a Channel Quality Indicator, CQI, based on the measured transmissions.

12. The method according to claim 1, further comprising receiving the RI and/or a Channel Quality Indicator, CQI, of the channel to be used for the transmissions to the first wireless device from the second wireless device.

13. The method according to claim 1, further comprising receiving the information about the preferred interference subspace from a second network node serving the second wireless device in the wireless communications network.

14. A network node for determining a precoder for transmissions to a first wireless device in a wireless communications network, comprising:
 a receiver configured to obtain at least a Rank Indicator, RI, of a channel used for the transmissions to the first wireless device, and obtain information about a preferred interference subspace from a second wireless device in the wireless communications network, wherein the second wireless device is interfered by the transmissions to the first wireless device, and
 a processor configured to determine the precoder for the transmissions to the first wireless device based on the obtained information about the preferred interference subspace if the at least obtained RI of the channel fulfills a first threshold criterion.

15. The network node according to claim 14, wherein the RI is indicative of a number of transmission layers preferably used for the transmissions to the first wireless device.

16. The network node according to claim 14, wherein the first threshold criterion is fulfilled if the RI is equal to or below a number of polarizations available for the transmissions to the first wireless device.

17. The network node according to claim 14, wherein the receiver is further configured to obtain a Channel Quality Indicator, CQI, of the channel to be used for the transmissions to the first wireless device, and the processor is further configured to determine the precoder based on the obtained information about the preferred interference subspace if the obtained CQI of the channel fulfills a second threshold criterion.

18. The network node according to claim 17, wherein the CQI is indicative of a signal-to-interference-plus-noise-ratio, SINR, of the channel to be used for the transmissions to the first wireless device.

19. The network node according to claim 17, wherein the second threshold criterion is fulfilled if the CQI is equal to or above a determined threshold value.

20. The network node according to claim 14, wherein the receiver is further configured to receive an estimated throughput gain that the second wireless device experiences in case the network node determines the precoder based on the obtained information about the preferred interference subspace.

21. The network node according to claim 20, wherein the processor is further configured to determine an estimated throughput loss that the first wireless device experiences for the transmissions in case the network node determines the precoder based on the obtained information about the preferred interference subspace, and to determine the precoder based on the obtained information about the preferred interference subspace if the determined estimated throughput loss is below the received estimated throughput gain.

22. The network node according to claim 14, wherein the obtained information about the preferred interference subspace comprises an indication of a subspace preferred by the second wireless device for interference caused by the transmissions to the first wireless device.

23. The network node according to claim 22, wherein the indication comprises a Precoding Matrix Indicator, PMI, indicating a pre-coding matrix in a codebook.

24. The network node according to claim 14, wherein the processor is further configured to measure a first transmissions received from the first wireless device, and to determine the RI and/or a Channel Quality Indicator, CQI, based on the measured transmissions.

25. The network node according to claim 14, wherein the receiver is further configured to receive the RI and/or a Channel Quality Indicator, CQI, of the channel used for the transmissions to the first wireless device from the second wireless device.

26. The network node according to claim 14, wherein the receiver is further configured to receive the information about the preferred interference subspace from a second network node serving the second wireless device in the wireless communications network.

27. The network node according to claim 14, further comprising a memory wherein said memory is containing instructions executable by said processor.

28. A method performed by a second wireless device served by a second network node in a wireless communications network for enabling a first network node to determine a precoder for transmissions to a first wireless device in the wireless communications network, the method comprising:
 detecting interference caused by the transmissions from the first network node to the first wireless device;
 determining a preferred interference subspace for the interference caused by the transmissions from the first network node to the first wireless device;
 determining an estimated throughput gain that the second wireless device experiences in case the first network node determines the precoder for the transmissions from the first network node to the first wireless device based on the determined information about the preferred interference subspace; and
 transmitting information indicating the determined preferred interference subspace and the estimated throughput gain to the first network node via the second network node if the determined estimated throughput gain is above a determined threshold.

29. A second wireless device served by a second network node in a wireless communications network for enabling a first network node to determine a precoder for transmissions to a first wireless device in the wireless communications network, the second wireless device comprising:
- a receiver configured to detect interference caused by the transmissions from the first network node to the first wireless device;
- a processor configured to determine a preferred interference subspace for the interference caused by the transmissions from the first network node to the first wireless device, and to determine an estimated throughput gain that the second wireless device experiences in case the first network node determines the precoder for the transmissions from the first network node to the first wireless device based on the determined information about the preferred interference subspace; and
- a transmitter configured to transmit information indicating the determined preferred interference subspace and the estimated throughput gain to the first network node via the second network node if the estimated throughput gain is above a determined threshold.

30. The second wireless device according to claim 29, further comprising a memory wherein said memory is containing instructions executable by said processor.

* * * * *